UNITED STATES PATENT OFFICE.

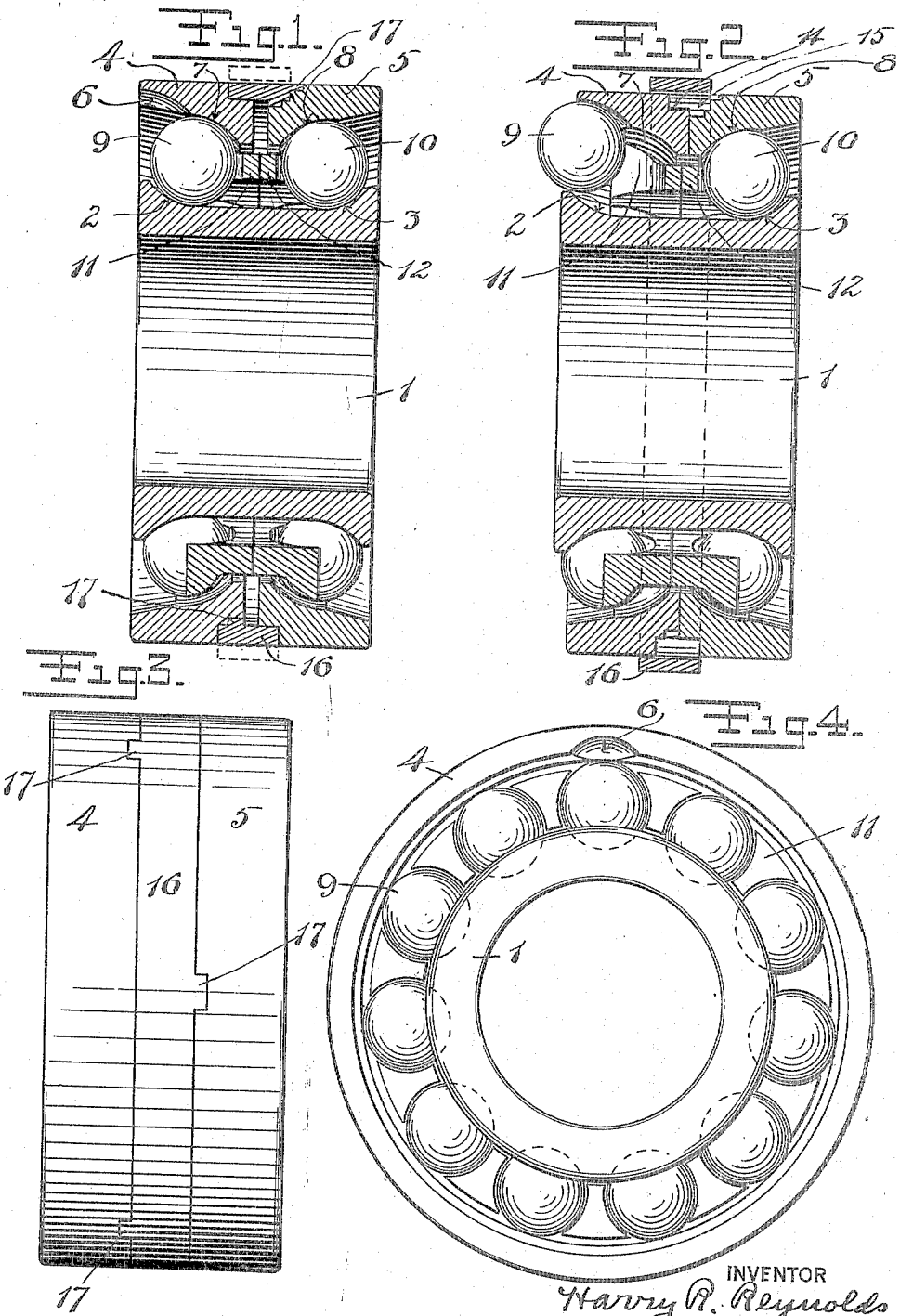

HARRY R. REYNOLDS, OF NEW BRITAIN, CONNECTICUT, ASSIGNOR TO FAFNIR BEARING COMPANY, OF NEW BRITAIN, CONNECTICUT, A CORPORATION OF CONNECTICUT.

BALL-BEARING.

1,325,910.    Specification of Letters Patent.    Patented Dec. 23, 1919.

Application filed May 14, 1919. Serial No. 297,037.

*To all whom it may concern:*

Be it known that I, HARRY R. REYNOLDS, a citizen of the United States of America, residing at New Britain, Connecticut, have invented a new and useful Ball-Bearing, of which the following is a specification.

My invention relates to improvements in antifriction bearings of the double row ball type and is primarily an improvement upon the bearing set forth in Carlson Patent # 1,222,846 of April 17th, 1917. The object of the present invention is to improve the means and method by which the bearing is assembled with a view to increasing the strength, durability and efficiency of the same.

In the accompanying drawings:

Figure 1 is a cross section of the finished bearing.

Fig. 2 is a similar view as the parts appear in the process of assembling.

Fig. 3 is a view of the edge of the bearing complete.

Fig. 4 is a side elevation of the complete bearing.

The bearing is made up of outer and inner ring elements which are so formed as to provide two sets of race-ways in which are arranged two series of balls. One of the ring elements, preferably the outer one, is made up of two axially displaceable ring sections, which sections, in the finished bearing, are permanently spaced apart by an endless integral ring.

In the drawings I have shown only the preferred embodiment of my invention.

1 represents an inner bearing ring element which in this particular instance is so shaped as to provide two inwardly facing bearing shoulders or ball tracks 2—3. The outer bearing ring element is made in two sections 4 and 5, each of which is provided with an outwardly facing bearing shoulder or ball track. These tracks are indicated respectively 7—8. 9—9 are the balls of one series, while 10—10 are the balls of a second series. The balls 9—9 are arranged between the complementary tracks 2—7 while the balls 10 are arranged between the complementary tracks 3—8. The width of the ring members 4—5 is such that when they are brought together as shown in Fig. 2, the balls 9—9 may be successively introduced, the balls 10—10 having been previously introduced by simply displacing the inner ring 1 relatively to the member 5 to a sufficient extent to permit all of the balls 10 to be freely inserted. When this first series of balls 10—10 is introduced, the bearing rings are moved into the position shown in Fig. 2, and the balls 9—9 are then inserted. To facilitate this operation, a side entrance notch 6 may be provided at one point in the ring section 4. 11—12 are ball spacing members which may be provided, the same being formed in any suitable way to space the balls as shown. The particular form of the ball spacing device may be modified in a variety of ways. 14—15 are annular recesses in the outer surfaces of the ring sections 4—5 respectively, the same being provided to receive a ring spacing means which will now be described.

When the race-ways have both been filled with the desired complement of balls, the two bearing ring members 4—5 are moved apart as indicated in Fig. 1. An endless band or ring 16 is then slipped over the bearing until it stands over the annular recesses 14—15. Powerful pressure is then applied to the band 16 to reduce it circumferentially and to thereby force it bodily into the said recesses so that it will act as a permanent spacer for the ring sections 4—5, as shown in Fig. 1. This circumferential reduction of the band 16 results in causing the cross section thereof to be somewhat increased, so that as it is crowded into its seat, between the ring sections 4—5, it will cause said sections to be pressed apart so that the balls 9—10 will be snugly seated in their respective race-ways.

At any suitable intervals in the circumference of the ring members 4 and 5, notches may be provided adjacent to the space to be occupied by the spacer band 16 so that a portion of the metal of said band may flow into said notches to form interlocking keys as indicated at 17—17 in Fig. 3 whereby the ring sections 4—5 may not turn independently. When finished the outer ring element is practically a unitary structure. These notches for receiving the interlocking projections may be at the sides of the recesses 14—15, or they may be in the bottom of each of said recesses, or they may be formed in both the bottom and side walls, the number, shape and size of the notches being immaterial.

If the spacing band 16 has been forced in and laterally expanded to such an extent as to cause the bearing to bind, this binding may be overcome by simply applying a suitable blow to the divided ring element (in this instance the parts 4—5) so as to crowd them a little closer together, thus freeing the engagement of the rings and balls so that the bearing will work easily.

Any suitable means may be provided for forcing the endless band 16 into position between the parts 4—5 so long as said means is powerful enough to actually reduce the endless ring circumferentially and cause the metal to properly fill said space and any notches provided therein to receive the aforesaid interlocking keys.

When the bearing is fully assembled, any irregularity that may possibly be present on the outer surface where the spacer band 16 meets the outer ring sections 4—5 may be ground down to a proper finish.

Since the spacer band 16 is subjected to no wear this part of the bearing may be unhardened, whereas the parts 1, 4 and 5 are, of course hardened. The band 16 is preferably made of iron or steel or any material sufficiently hard to withstand heat and such pressure as would be occasioned in the event the bearing is required to withstand thrust, and it should be said in this connection that a bearing of this type is well adapted to take endwise thrust by reason of the relatively oblique positioning of the complementary ball tracks. I am aware that heretofore bearings of this general character have been produced in which the ring elements have been separated by soft metal, heated and introduced in a fused state, but obviously such metal is too soft to withstand for any length of time the pressure of endwise thrust. Furthermore, in the assembling of such a bearing there is danger that the molten material may flow into the space to be occupied by the balls to the injury thereof. In the case of the Carlson construction which employs a hard metal strip of a length approximating the circumference of the bearing, it is obvious that much difficulty will be experienced in making the strip of exactly the proper length to cause the ends thereof to come snugly together. Obviously, if the Carlson strip is too short, a gap will be left between the ends and so if the Carlson strip is too long, difficulty will be experienced in assembling the bearing. By my invention which contemplates the embodiment of an endless band of relatively non-fusible material, the finished bearing possesses advantages heretofore unattained in bearings of this type, some of which have already been explained and others of which will be understood and appreciated by mechanics skilled in this art.

What I claim is:

1. A ball bearing comprising a channeled member having annular shoulders to provide thrust receiving ball tracks, a pair of bearing members concentrically arranged with respect to said channeled member and having annular ball tracks confronting the ball tracks of said channeled member, said bearing members being displaceable axially toward each other to permit balls to be introduced between confronting ball tracks, two sets of balls between said confronting sets of ball tracks and spreading means for said bearing members comprising an endless hard metal spreading member permanently secured between the axially displaceable bearing members to hold the same spaced apart to maintain the respective ball tracks thereon in proper operative relation with the confronting ball tracks on the other bearing member, said parts being constructed to enable the insertion and deformation of said spreading member between said axially displaceable bearing members in the act of assembling the bearing.

2. A ball bearing comprising a bearing member provided with two spaced ball races, a coöperating bearing member composed of a plurality of axially displaceable rings each constructed to provide a ball race to coöperate with one of the ball races on the first mentioned bearing member, two rows of balls in the spaces between coöperating ball races, a non-removable hard metal endless band between said two rings operating to hold the same at fixed operative relation to cause the companion ball races to properly engage said two rows of balls and means permanently securing said hard metal spacing member in spacing position between the two rings of the two-part bearing member.

3. In a ball bearing of the double row type, two annular bearing members having two sets of ball races to receive two rows of balls, one of said bearing members comprising two rings axially displaceable to permit of the assembling of the bearing when said rings are brought together, a hard metal deformable spacing device in the form of an endless band, the two ring bearing member having a recess to receive said spacing member, the bottom of said recess forming a supporting platform for said deformable spacing member.

4. In a bearing of the character described, a one-piece bearing ring member having two oppositely faced ball tracks, a two-piece bearing ring member having complementary ball tracks for the first mentioned ball tracks respectively, the two pieces of said second bearing member being axially displaceable, and an endless band of hard metal located between the two pieces of the second bearing member to permanently hold the same in operative position.

5. In a bearing of the character described, a one-piece bearing ring member having two oppositely faced ball tracks, a two-piece bearing ring member having complementary ball tracks for the first mentioned ball tracks respectively, the two pieces of said second bearing member being axially displaceable, and an endless band of hard metal located between the two pieces of the second bearing member to permanently hold the same in operative position, notches in the two parts of said two-part member adjacent to said endless band with portions of said endless band extending into said notches to form interlocking keys to prevent the independent rotation of said two parts.

6. The herein disclosed process of securing the two race rings of a ball bearing in permanently spaced relation which comprises deforming an endless spacing band of different diameter from said race rings into a space between the rings to thereby provide a continuous spacing element holding the rings in separated relation.

7. The herein disclosed process of securing the race rings of a ball bearing in permanently spaced relation which comprises compressing an endless spacing band of greater diameter than said race rings into a space between the rings to thereby provide a continuous spacer holding the rings in separated relation.

HARRY R. REYNOLDS.